UNITED STATES PATENT OFFICE

GEORG SCHEUING AND BRUNO WALACH, OF NIEDER-INGELHEIM ON-THE-RHINE, GERMANY, ASSIGNORS TO C. H. BOEHRINGER SOHN AKTIENGESELLSCHAFT, OF NIEDER-INGELHEIM ON-THE-RHINE, GERMANY, A CORPORATION OF GERMANY

3-ETHYL-4-CYCLOHEXYL-1,2,4-TRIAZOLE

No Drawing. Application filed February 27, 1931, Serial No. 518,883, and in Switzerland August 24, 1929.

The invention relates to a new compound 3-ethyl-4-cyclohexyl-1,2,4-triazole, having the formula

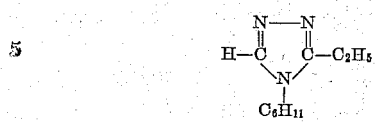

The new 3-ethyl-4-cyclohexyl-1,2,4-triazole crystallizes from ether or benzene in compact prisms of melting point 89° C. and boiling point 227° C. at 11 mm. It is very readily soluble in water. Melting point of the crystallized picrate 159° C.

It has been unexpectedly found that the aforementioned triazole possesses admirable analeptic properties, which was the more unexpected as therapeutic effects of any kind were hitherto not known in triazoles. Thus, for example, the action of the new triazole on the respiration of an animal suffering from respiratory disease is about 20 times as great as that of the pentamethylene tetrazole, whilst on the other hand the poisonous properties in proportion to the activity are somewhat less than those of the said tetrazole. The heart action of an isolated damaged heart is improved even above the normal by the action of the new triazole.

The new triazole may be prepared in different ways. It may be prepared according to the following Examples 1 and 2 according to the process of our co-pending application Serial Number 403,113 by causing an imido compound of the type

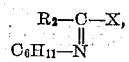

where X indicates a radicle, such as an acid residue, an alkyl oxy group, a halogen or the like, which is capable of entering into combination with one of the hydrogen atoms of the primary amino group of a hydrazine residue, to react with an acyl hydrazine of the type $H_2N-N-CO-R_1$, where $R_1$ may be a hydrogen atom and $R_2$ an ethyl group or vice versa.

The interaction between the aforesaid imido compounds and the acid hydrazines proceeds according to the following equations:

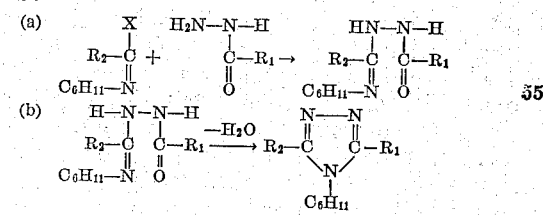

According to (a) the residue X of the imido compound is split off together with the hydrogen atom of the primary amino group of the acyl hydrazine with a change in the double bond and formation of the hydrazidine. The resulting hydrazidine is then converted into the triazole by the splitting off of 1 mol. of water according to (b) and closure of the ring; according to the working conditions, either spontaneously or readily by heating; if desired after first isolating from the reaction mixture.

According to the distribution of the substituents $R_1$ and $R_2$, i. e. hydrogen and ethyl, or vice versa, in the reaction components, the formation of the triazole can take place according to the following two molecular equations:

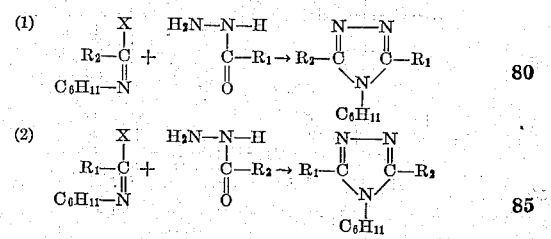

The triazoles obtained according to (1) and (2) are identical with one another as can be immediately seen on rotating one of the two structural formulæ through 180°.

The imido compounds of the above type to be used as starting materials, for example, imido esters of the type

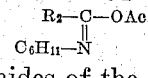

or imido halogenides of the type

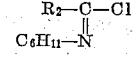

and the like may be obtained, starting for example from the corresponding monosubstituted acid amides, for example propionylcyclohexylamine or formylcyclohexylamine by acylating the same in their enolic form, for example by treating the monosubstituted acid amides with acid halogenides. In this case the operation is in general advantageously effected in the presence of basic reacting substances, particularly organic bases such as pyridine. Similarly, imido compounds of the aforesaid kind can be obtained by subjecting the esters of the corresponding oximes to an intra-molecular Beckmann re-arrangement. In general, the imido compounds in question are employed in a non-isolated condition in the form of the reaction mixture obtained during its preparation without previous isolation and purification.

The reaction components may be caused to react with one another in solution or, if desired, in suspension or also without using solvents or dispersing agents. The conversion with advantage takes place in the presence of an organic solvent such as benzene, chloroform, alcohol etc. or a mixture of organic solvents if desired in the simultaneous presence of water. The conversion of the intermediately formed hydrazidine into the triazole with elimination of 1 mol. of water either takes place spontaneously under the reaction conditions or on slight warming.

The preparation of the new 3-ethyl-4-cyclohexyl-1,2,4-triazole may also be effected by converting the corresponding non-acylated hydrazidines with anhydrides of fatty acids or with the fatty acids themselves whereby acyl hydrazidines are obtained as intermediate products which on splitting off water yield the desired triazole according to the following equations:—

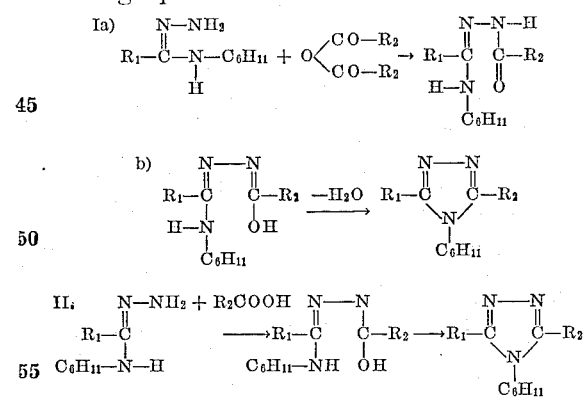

In this case also both $R_1$ and $R_2$ may interchangeably represent a hydrogen atom or an ethyl group so that each of these radicles can be introduced into the triazole both with the non-acylated hydrazidine and with the fatty acid anhydride or the fatty acid.

*Examples*

1. 78 grms. of propionylcyclohexylamine (=1/2 mol.) and 80 gms. of pyridine are dissolved in 180 ccs. of chloroform or benzene and treated at moderate temperature with 89 gms. of benzene sulphonic acid chloride (=1/2 mol.). On completion of the esterification this solution containing the lactim ester is caused to react with a solution of 30 gms. formylhydrazine (=1/2 mol) dissolved in 100 ccs. of alcohol. The reaction mass is rendered slightly alkaline, repeatedly extracted and the extract concentrated by evaporation. The resulting 3-ethyl-4-cyclohexyl-1,2,4-triazole boils at 227° C. (at 11 mm.). It crystallizes from ether or benzene into compact prisms of melting point 89° C., is very readily soluble in water and yields a beautiful crystalline picrate of melting point 159° C. Yield about 70% and more of theory.

The conversion takes place according to the equation:

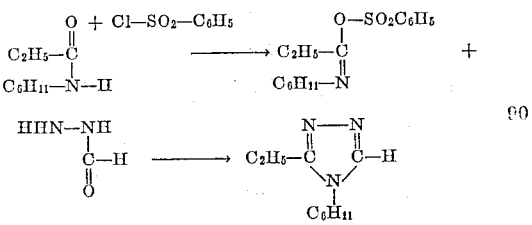

2. 64 gms. of formylcyclohexylamine (=1/2 mol.) and 80 gms. of pyridine are dissolved in 80 ccs. of chloroform and treated under cooling with 89 gms. of benzene sulphonic acid chloride (=1/2 mol.). The lactim ester solution is allowed to react with a solution of 44 gms. of propionic acid hydrazide (=1/2 mol.) in about 100 ccs. of chloroform. The product is further worked up as in Example 1. 3-ethyl-4-cyclohexyl-1,2,4,-triazole of melting point 89° C. is obtained in good yield of 60% and more.

The conversion takes place according to the equation:

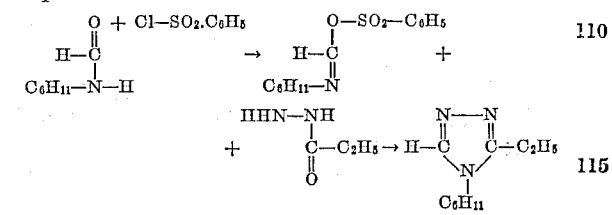

The triazole thus obtained is identical with the triazole obtained as in Example 1 can be seen on rotating the structural formula through 180° C.

3. 78 gms. of propionyl hexylamine (1/2 mol.) are dissolved with 80 gms. of pyridine in 180 ccs. of chloroform and esterified for some time at moderate temperature (about 10° C.) with 90 gms. of benzene sulphonic acid chloride. The resulting imido ester solution is allowed to react at slightly increased temperature with a suspension of 40 gms. of hydrazine formate (1/2 mol.) in chloroform or with a solution in alcohol with or without the addition of potassium acetate or formate. The hydrazidine first formed is acylated by the formic acid present and triazole formation takes place with elimination of water. The non-converted hydrazine is separated from the reaction solution as sulphate by means of diluted sulphuric acid and the solution after rendering alkaline is further worked up as in Example 1. 3-ethyl-4-cyclohexyl-1,2,4-triazole of melting point 89° C. is obtained in a yield of about 50—60% of theory.

The conversion takes place according to the equation:

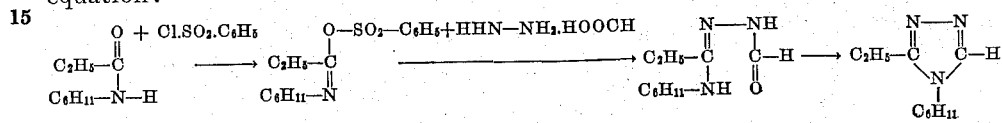

What we claim is:—

As a new compound 3-ethyl-4-cyclohexyl-1,2,4-triazole.

In testimony whereof we affix our signatures.

Dr. GEORG SCHEUING.
Dr. BRUNO WALACH.